(12) United States Patent
Schilling et al.

(10) Patent No.: US 8,911,550 B2
(45) Date of Patent: Dec. 16, 2014

(54) GLUTAMINE-RICH PEPTIDES AS AIR ENTRAINING AGENTS IN BUILDING MATERIAL COMPOUNDS

(71) Applicant: Evonik Industries AG, Essen (DE)

(72) Inventors: Martin Schilling, Bonn (DE); Christoph Toelle, Duisburg (DE); Ralph Scheuermann, Essen (DE); Sabine Giessler-Blank, Dortmund (DE); Jörn Heißing, Essen (DE)

(73) Assignee: Evonik Industries AG, Essen (DE)

( * ) Notice: Subject to any disclaimer, the term of this patent is extended or adjusted under 35 U.S.C. 154(b) by 0 days.

(21) Appl. No.: 13/855,494

(22) Filed: Apr. 2, 2013

(65) Prior Publication Data

US 2013/0255541 A1   Oct. 3, 2013

(51) Int. Cl.
| | |
|---|---|
| *C04B 24/14* | (2006.01) |
| *C04B 16/00* | (2006.01) |
| *C04B 28/02* | (2006.01) |
| *C04B 38/02* | (2006.01) |
| *C04B 103/42* | (2006.01) |
| *C04B 103/30* | (2006.01) |

(52) U.S. Cl.
CPC ............... *C04B 16/00* (2013.01); *C04B 24/14* (2013.01); *C04B 38/02* (2013.01); *C04B 2103/304* (2013.01)
USPC ............ 106/808; 106/727; 106/810; 106/823

(58) Field of Classification Search
USPC .................................. 106/727, 808, 810, 823
See application file for complete search history.

(56) References Cited

U.S. PATENT DOCUMENTS

| | | | | |
|---|---|---|---|---|
| 5,024,703 | A | * | 6/1991 | Gustafsson et al. .......... 106/649 |
| 5,211,751 | A | * | 5/1993 | Arfaei et al. .................. 106/727 |
| 5,378,279 | A | * | 1/1995 | Conroy ......................... 106/719 |
| 6,642,285 | B1 | * | 11/2003 | Bohner ......................... 523/115 |
| 7,601,680 | B2 | * | 10/2009 | Wang et al. ................... 510/466 |
| 2006/0052298 | A1 | * | 3/2006 | Guerrant et al. ................. 514/12 |
| 2010/0016207 | A1 | * | 1/2010 | Wurtman et al. ................. 514/2 |
| 2013/0251658 | A1 | * | 9/2013 | Schilling et al. ........... 424/70.14 |

FOREIGN PATENT DOCUMENTS

| | | | |
|---|---|---|---|
| DE | 19751512 A1 | * | 5/1999 |
| DE | 102010062762 | | 6/2012 |
| DE | 102010062762 A1 | * | 6/2012 |
| FR | 2680781 A | * | 3/1993 |
| GB | 2251857 A | * | 7/1992 |
| JP | 52043814 A | * | 4/1977 |
| JP | 52089121 A | * | 7/1977 |
| JP | 55029518 A | * | 3/1980 |
| WO | WO 9905918 A1 | * | 2/1999 |
| WO | WO2005/026072 A1 | * | 3/2005 |
| WO | WO 2009/077210 | | 6/2009 |
| WO | WO 2011/106816 | | 9/2011 |

* cited by examiner

*Primary Examiner* — Anthony J Green

(74) *Attorney, Agent, or Firm* — Frommer Lawrence & Haug LLP

(57) ABSTRACT

The use of hydrolysates of glutamine-rich proteins for use as air entraining agents in building material compounds.

9 Claims, 1 Drawing Sheet

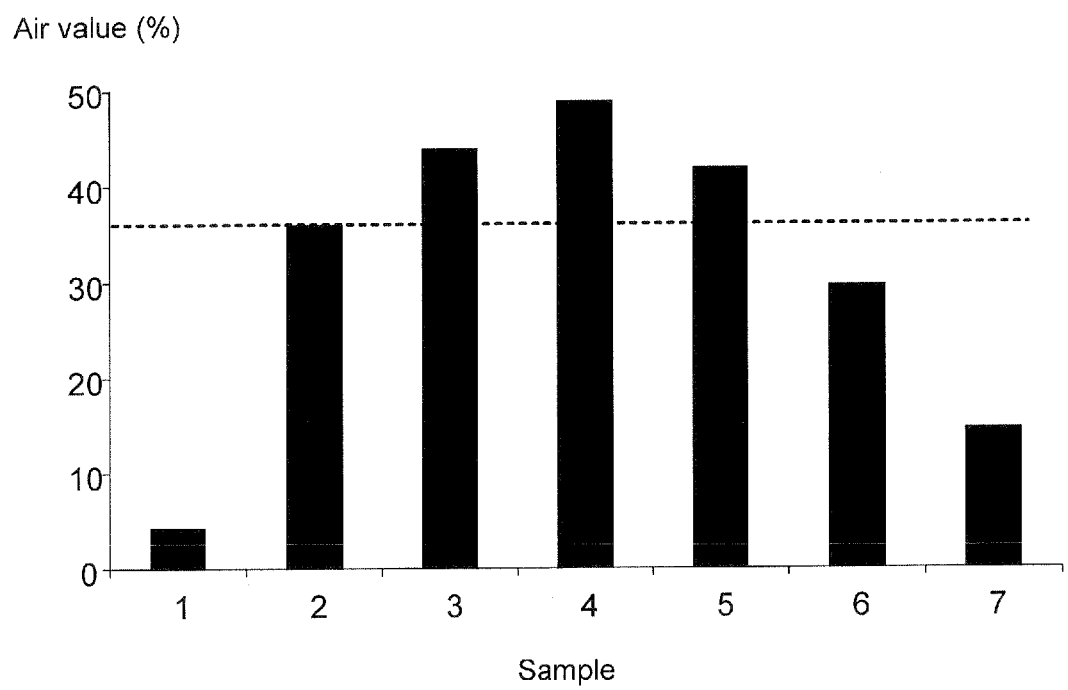

GLUTAMINE-RICH PEPTIDES AS AIR ENTRAINING AGENTS IN BUILDING MATERIAL COMPOUNDS

The present application claims priority from German Patent Application No. DE 10 2012 205 372.7 filed on Apr. 2, 2012, the disclosure of which is incorporated herein by reference in its entirety.

FIELD OF INVENTION

The invention relates to additives for building material mixtures which influence the air content of these building material mixtures.

It is noted that citation or identification of any document in this application is not an admission that such document is available as prior art to the present invention.

Building material mixtures, in particular concrete and mortar mixtures, are often treated with additives in order to influence the air content of the mixture and the distribution of the air voids. These as a rule spherical air voids, the diameter whereof is of the order of magnitude of 1 μm to 1 mm, are deliberately introduced into the building material mixture during the mixing of the cement, in order to increase the freeze-thaw resistance of cement stone such as for example concrete road surfaces. A further field of use for air entraining agents is resurfacing. In this, both the insulating and also the weight-decreasing properties of the air bubbles are the priority. The latter is important for many other applications where the weight is relevant, such as for example porous concrete or gypsum plaster board or as a filler material for earth-moving and civil engineering works.

The introduction of air or air bubbles can be effected either by introduction of shear energy during mixing or in the case of porous concrete through additives which themselves release gas such as for example aluminium particles, which in an alkaline aqueous environment release hydrogen. The resulting air or gas bubbles must be stabilized by surface-active additives in order to prevent air removal in the further course of processing. These additives, which are described as air entraining agents, are described in the state of the art and are mostly based on organic wood resins, or the corresponding soaps or on synthetic surfactants. As a rule, these are liquid and are mostly added to the building material mixture in aqueous solution during mixing. A disadvantage in the use of liquid products is that these cannot simply be premixed into dry mortar mixtures, without the upstream inclusion of an energy- and thus time- and cost-intensive process such as spray-drying, encapsulation etc. for their conversion into a solid form.

However, there is also a need for inexpensive and environmentally compatible products in applications wherein liquid air entraining agents can be used, such as for example in concretes.

Animal, plant and microbial proteins are used as raw materials for a multitude of industrial applications. In many cases, the functional and processing properties of the products are improved by acid, alkaline or enzymatic hydrolysis to low molecular weight peptide mixtures. Both proteins and peptides are amide-linked condensation products of amino acids which are distinguished on the basis of their molecular weight. Although the boundary is not precisely defined, polypeptides with fewer than 100 amino acids are mostly described as peptides (Römpp Chemical Dictionary, Georg Thieme Verlag, 2011). The polymers formed in the hydrolysis are likewise mostly described as peptides. In contrast to the selective enzymatic hydrolysis of the peptide bonds by proteases, which mostly takes place under mild reaction conditions, the acid or alkaline hydrolysis of the peptide bond requires drastic conditions. At high temperature and extreme pH values, a range of side-reactions take place, inter alia also the hydrolysis of the glutamine and asparagine residues, in which glutamic acid and aspartic acid residues are released.

To describe the hydrolysates, the degree of hydrolysis of the protein is often employed. This is defined as the number of amino groups released by the hydrolysis of the peptide bonds, based on the amino groups releasable in complete hydrolysis (to amino acids) and is stated as a percentage value (see Nielsen, P. M. et al., 2001, Journal of Food Science, Vol. 66, No. 5). Various derivatization methods for the photometric detection of the amino groups are described for this. One example is derivatization with ortho-phthalaldehyde followed by detection at a wavelength of 340 nm.

It is known from the literature that plant, animal and microbial proteins and hydrolysates and derivatives produced therefrom can favourably influence air entrainment of mortar (Plank et al. 2004). For example, JP2000226245A describes the use of enzymatically hydrolyzed soya protein as an air entraining agent in cement compositions. The use of protein hydrolysates as air entraining agents is also described in P160970. As well as enzymatic hydrolysates, hydrolysates produced by the action of acid or base are also described for this purpose. GB2251857A for example describes the use of alkali-hydrolyzed soya proteins, horn and hoof proteins, ox blood proteins, etc.

The practically water-insoluble, viscoelastic protein fraction which is obtained after the exhaustive washing of a wheat flour/wheat flour dough with water is described as gluten (synonyms: wheat gluten, wheat protein). It arises inter alia as a by-product during the production of starch from wheat. The proteins present in wheat flour consist of very complex mixtures. The characterization of the wheat flour proteins on the basis of their solubility was carried out for the first time in 1907 by T. B. Osborne. The four fractions obtained are therefore described as Osborne fractions. These include the water-soluble wheat protein fractions, the albumins and globulins, and the non-water-soluble prolamines (gliadin) and glutelines (glutenin) (Belitz, H.- D. and Grosch, W, 1999). A similar classification is also made for the storage proteins of other cereal species.

The use of gluten itself as an air entraining agent is known. JP52043814A describes the use of wheat gluten for air entrainment in combination with various cements. As well as casein and one other protein, the use of gluten from wheat flour for air entrainment in mortar was described by Chandra, S. et al. (*Influence of proteins on some properties of Portland cement mortar*, International Journal of Cement Composites and Lightweight Concrete, 9 (2), 91-94, 1987). Further, EP0181849B1 describes the use of wheat gluten as an air entraining agent.

Further, condensation products of fatty acid chlorides and proteins or protein hydrolysates, which are known to have surfactant properties, can be used as air entraining agents in building materials. An example of collagen and hydrolysates thereof modified in this manner is described in FR2680781.

Thus for example from the German patent application DE19751512A, the use of protein concentrates of plant origin as an additive component in cement-based adhesive mortars is known. In particular, the leguminous proteins used here are intended to intensify the setting and adhesive bonding between a solid undersurface material as support substrate and the ceramic or mineral surfacing materials fixed thereon by means of the bonding mortar, and compensate adverse effects. The protein concentrates used are finely divided seed proteins (soya proteins) in dry form, which are obtained from the seeds by known process steps such as dehusking, rolling or oil extraction.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Hence the purpose of the present invention is the provision of inexpensive peptides as air entraining agents in hydraulically curable building material compounds.

BRIEF DESCRIPTION OF THE DRAWINGS

FIG. 1 shows the air content of various samples according to the examples.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Surprisingly, it has been found that peptides or peptide mixtures with a high glutamine content are capable of keeping large quantities of air dispersed in hydraulically curable building materials.

Keeping quantities of air dispersed in hydraulically curable building materials means that the air introduced into the building material compound does not escape again from the compound. Preferably the air does not escape right up to the so-called setting of the compound, which is understood to mean a rise in the viscosity of the compound.

Preferably, the air remains in the building material compound until solidification. Solidification is understood to mean that it is not possible to deform the building material compound without crack formation. Particularly preferably, solidification is understood to mean complete hardening. Complete hardening relates to the particular static properties, such as for example breaking strength, guaranteed for the hardened building material.

A subject of the present invention is the use of peptides or peptide mixtures with at least 16 wt. % of glutamine, preferably at least 20 wt. %, more preferably at least 25 wt. %, still more preferably at least 30 wt. %, still more preferably at least 35 wt. % of glutamine, based on the total mass of the peptides, as air entraining agents in hydraulically curable building materials.

A further subject of the present invention are compositions containing at least one peptide with at least 16 wt. % of glutamine, preferably more than 20 wt. %, more preferably at least 25 wt. %, still more preferably more than 30 wt. %, particularly preferably more than 35 wt. % of glutamine, based on the total mass of the peptides.

In the context of this invention, the terms gluten, wheat gluten and wheat protein are used synonymously.

In the context of the invention, components of gluten are in particular understood to be those which were characterized by Osborne on the basis of their solubility. The fractions obtained are described as Osborne fractions. These include the water-soluble wheat protein fractions, the albumins and globulins and the non-water-soluble prolamines (gliadin) and glutelines (glutenin) (Belitz, H.- D. and Grosch, W, Food Chemistry, 2nd ed./translation from the fourth German edition by M. Burghagen, 1999, p 637ff). A similar classification is also made for the storage proteins of other cereal species.

The aforementioned components of gluten and/or components obtained in other ways are included, irrespective of their variable distribution in the overall mixture. The different distributions by mass can be of natural origin or also be based on the renewed mixing of previously separated or partially separated components.

If necessary, other proteins can also be mixed into the gluten. These can derive from other cereal species, e.g. from rye, barley, oats, millet or rice, and leguminosae such as for example peas and/or soya, and also maize, amaranth and/or quinoa.

Wheats are understood to include all Poaceae of the genus *Triticum*, e.g. *T. aesrtivum, T. antiquorum, T. carthlicum, T. compactum, T. compositum, T. dicoccides, T. dicoccon, T. durum, T. estivum, T. flaksbergeri, T. hybernum, T. ispahanicum, T. kiharae, T. macha, T. orientale, T. persicum, T. polonicum, T. pyramidale, T. sativum, T. spelta, T. sphaerococcum, T. timopheevii, T. turanicum, T. trugidum, T. urartu, T. vulgare, T. vulgaris, T. zbukovskyi*, or *T. monococcum*. Moreover, *Triticum×dimococcum, Triticum×fungicidum, Triticum× soveticum* and *Triticum×timococcum* are also included. The species enumerated can also be divided into subspecies and/or varieties such as for example *T. aestivum* ssp. *spelta*. In the German-speaking world, other designations for wheat in the sense of the invention are also known, such as for example Dinkel, Spelz, Schwabenkorn, Franckenkorn, Weichweiren, Emmer, Einkorn or Hartweizen. Optionally, here these can also be different varieties or special breeds of Poaceae of the genus *Triticum*. In the context of this invention, all these designations are claimed under the term wheat.

Maize is understood to mean all Poaceae of the genus *Zea*, e.g. *Z. mays, Z. altissima, Z. americana, Z. erythrolepis, Z. hirta, Z. mais, Z. maiz, Z. saccharata, Z. segetalis, Z. vulgaris*. Synonyms of the genus name are *Mays* and *Mayzea*, and the synonymous species are for example *Mays americana, Mays zea* and *Mayzea cerealis*. The species enumerated can also be divided into subspecies and/or varieties such as for example *Z. mays* ssp. *mays* and *Z. mays* var. *saccharata*. In the German-speaking world, other designations for maize in the sense of the invention are also known, such as for example flint maize, dent maize, popcorn, sweet maize, flour maize, waxy maize and pod maize. In the context of this invention, all these designations are claimed under the term maize.

Amaranth (Amarant) and quinoa are understood to mean the Amaranthaceae of the genera *Amaranthus* and *Chenopodium*. The families Amaranthaceae and Chenopodiaceae were originally assigned to different families on the basis of morphological features. More recent molecular biology studies show that the close affinity justifies the assignment into one family under the name Amaranthaceae. The following species are mentioned by way of example: *Chenopodium quinoa, C. album* ssp. *quinoa* (Willd.) Kuntze, *C. album* var. *quinoa* (Willd.) Kuntze, *C. canihua* O. F. Cook, *C. ccoyto* Toro Torricio, *C. cchuchi-huila* Toto Torrico, *C. chilense* Pers., *C. guinoa* Krock. *C. hircinum* (Willd.) Aellen, *C. nuttalliae* Saff.; Synonyms of the genus *Chenopodium* L. are for example *Ambrina* Spach, *Meiomeria* Standl. and *Morocarpus* Boehm, *Amaranthus caudatus, A. mantegazzianus* Pass., *A. maximus* Mill., *A. edulis* Speg. and *A. caudatus* ssp. *mantagazzianus*; synonyms of the genus *Amaranthus* L. are for example *Acanthochiton* Torr., *Acnida* L., *Amblogyna* Raf., *Euxolus* Raf., *Goerziella* Urb., *Mengea* Schauer, *Montelia* A. Gray, *Sarratia* Moq., and Inca wheat (love-lies-bleeding). In the context of this invention, all these designations are claimed under the terms amaranth and quinoa.

Optionally, species and varieties can display different polyploidies, i.e. an elevated number (diploid is regarded as normal) of the chromosome sets, e.g. triploid, tetraploid, hexaploid, octoploid, decaploid or dodecaploid. Optionally, the chromo-some sets contained can be from one species (autoploid). However, they can also derive from different species (alloploid), thus for example allotetraploid chromosome sets and analogues thereof are also possible. Optionally, the polyploidy does not have to extend over the entire chromosome set (aneuploid).

In the context of the present invention, "glutamine-rich peptides" and "glutamine-rich proteins" are understood to be peptides or proteins which contain at least 16 wt. % of glutamine, preferably more than 20 wt. %, more preferably at least 25 wt. %, still more preferably more than 30 wt. %, particularly preferably more than 35 wt. % of glutamine, based on the total mass of the peptides or proteins. In the context of this invention "peptides" is understood to mean an amino acid sequence with a chain length of at least 2 amino acids, preferably at least 5 amino acids, more preferably at least 10, still more preferably at least 20 amino acids. The maximum number of amino acids can be up to 200, preferably up to 100. The sequence can be built up of natural or artificial amino acids. The peptides can be of synthetic or partly synthetic nature or can also have been isolated as a natural substance from an organism in the biosphere or from another source.

The glutamine-rich proteins can derive from different sources. They can be of natural origin and also of synthetic or partly synthetic nature. Optionally, other, non-glutamine-rich proteins can be mixed into the glutamine-rich proteins. These admixed proteins can likewise derive from different sources: of natural origin and also of synthetic or partly synthetic nature. The admixed proteins can also derive from the same source as the glutamine-rich proteins. Preferably at least 70 wt. % of the protein to be hydrolyzed based on the total quantity of protein is glutamine-rich. Particularly preferably, the glutamine content of the total quantity of protein is "glutamine-rich" as defined above, i.e. with a glutamine content of at least 16 wt. % of glutamine based on the total mass of the proteins.

Industrial proteins contain other additives. The protein content is thus mostly not 100% of the total mass. Mostly, the protein content has been determined via a nitrogen determination, thus for example the protein content of products of the firm Syral has been determined by means of the method according to Kjeldahl (ISO 3188).

Optionally, the glutamine-rich proteins can contain additives, such as for example metal salts, preservatives etc.

The use according to the invention is preferably of glutamine-rich hydrolysates of glutamine-rich proteins. Particularly preferable is the enzymatic hydrolysis of glutamine-rich proteins. Still more preferable is the use according to the invention of glutamine-rich peptides or peptide mixtures which have been obtained from enzymatically hydrolyzed protein with at least 16 wt. % of glutamine, preferably more than 20 wt. %, more preferably more than 30 wt. %, particularly preferably more than 35 wt. % of glutamine, based on the total mass of the peptides.

Particularly preferable is the use according to the invention of glutamine-rich peptides and/or peptide mixtures obtained from wheat protein, more preferably by hydrolysis of wheat protein and particularly preferably by enzymatic hydrolysis of wheat protein.

Also advantageous is the use according to the invention of protein hydrolysates with a molecular weight distribution between 203 and 100000 g/mol, preferably between 500 and 50000 g/mol and particularly preferably 1000 to 20000 g/mol.

The use according to the invention of protein hydrolysates with a molecular weight distribution between 203 and 100000 g/mol with a glutamine content of at least 16 wt. % based on the total mass of the hydrolysate is preferable. Enzymatic wheat protein hydrolysates with a molecular weight distribution between 203 and 100000 g/mol are particularly preferable. Enzymatic wheat protein hydrolysates with a molecular weight distribution between 203 and 100000 g/mol with a glutamine content of at least 16 wt. % based on the total mass of the hydrolysate are particularly preferable.

The use according to the invention of glutamine-rich peptides or peptide mixtures with a mass content of more than 70% of glutamine-rich peptides based on the total peptide mass, the molecular weight whereof is less than 14000 g/mol, is preferable.

Also preferable is the use according to the invention of protein hydrolysates which were produced with the use of enzymes, preferably of proteases, more preferably endoproteases and particularly preferably endoproteases which under suitable reaction conditions have little or no glutamine hydrolaze side activity. Commercially available endoproteases of industrial quality, such as are for example used in the detergent and foodstuffs industries, particularly preferably of endoproteases which under suitable reaction conditions have little or no glutamine hydrolase side activity (e.g. Subtilisin Carlsberg, α-chymotrypsin, trypsin, thermolysin, bromelain, papain. Examples of commercial preparations are e.g. Alcalase® 2.4 L FG and Neutrase® 0.8 L from the firm Novozymes) are preferably used.

Glutamine hydrolases and transglutaminases catalyze the hydrolysis of the side-chain of glutamine to glutamic acid. Glutamine hydrolase side activity is understood to mean the activity of any enzymes which catalyze the said side-chain hydrolysis. In the sense of the invention, such enzymes are unsuitable enzymes.

The hydrolysates according to the invention of the glutamine-rich proteins have preferably been obtained from the proteins of wheat, maize, amaranth and/or quinoa, more preferably from the glutamine-rich proteins of wheat and/or maize.

The hydrolysates according to the invention of the glutamine-rich proteins and also the hydrolysates not according to the invention of the glutamine-rich proteins and preferably of the proteins of wheat, maize, amaranth and/or quinoa can be regarded both as partly synthetic and also as natural peptides.

In the context of this invention, if reference is made to natural substances, e.g. glutamine, essentially all isomers are meant thereby, and the particular isomers occurring in nature are preferable, i.e. in the case mentioned here L-glutamine.

For the definition of natural substances, reference is made to the scope of the "Dictionary of Natural Products", Chapman and Hall/CRC Press, Taylor and Francis Group, e.g. in the online version of 2011: http://dnp.chemnetbase.com/.

A further use according to the invention of the glutamine-rich proteins, peptides and/or peptide mixtures is the production of compositions containing the glutamine-rich proteins, peptides and/or peptide mixtures.

In the composition according to the invention, the mass content of glutamine-rich peptides based on the dry mortar mass is preferably from 0.001 to 10%, preferably from 0.01 to 2% and particularly preferably from 0.05 to 0.5%.

The compositions according to the invention can contain one or more further additives. Preferable additives are for example solvents and binders. As solvents, the composition according to the invention can in particular contain water or mono- or polyhydric monomeric alcohols. Examples of monohydric alcohols are ethanol, propanol, isopropanol and butanol. Examples of polyhydric alcohols are ethylene glycol, propylene glycol, butylene glycol and hexylene glycol. Examples of mono- or polyhydric oligomeric or polymeric alcohols are butyl diglycol, dipropylene glycol, polyethylene glycol or polypropylene glycol. The composition according to the invention preferably contains a quantity of solvent such that the mass ratio of solvent to glutamine-rich peptides is from 0.1 to 1 to 100 to 1, preferably from 0.2 to 1 to 20 to 1 and particularly preferably from 0.3 to 1 to 10 to 1, based on the total mass of the mixture of solvent(s) and peptides.

The compositions according to the invention of the present invention are also advantageous for the production of building material compounds, preferably of hydraulically curable building material compounds.

"Hydraulically curable" building materials is understood to mean binder-containing building materials which harden with addition of water and/or air. In this, the water can be added in liquid form, or optionally derive from the environment, e.g. soil moisture, atmospheric moisture or even steam. In the context of this invention, hydraulically curable building materials are understood to mean for example concretes, mortars and gypsums which for example contain cement or calcium sulphate-based compounds such as for example anhydrite, as hydraulic components.

As well as glutamine-rich peptides and/or peptide mixtures, the compositions according to the invention can contain one or more additives selected from flow improvers, binders, retardants, solidification accelerators, antishrinkage additives, solvents, preservatives, pigments, antifreeze agents, polymers, additives for internal curing, thickeners, hydrophobization agents and/or flow improvers.

After their formulation, the compositions according to the invention can be solid or liquid. The addition of liquid additives does not mean that the compositions formed are liquid. Solid compositions are for example powdery, liquid compositions are flowable at temperatures of use. Optionally, the flowability is produced or increased with the application of mechanical force. Mechanical force is understood to mean for example the action of vibrators or also ultrasound. The temperatures of use are not limited to the temperature range above 0° C. even with use of water as solvent.

As binders, the composition according to the invention can contain for example all binders known in the construction sector. The composition according to the invention can contain one or more of these binders. Preferable binders are selected from binders containing cement and calcium sulphate (or modifications thereof containing water of crystallization), such as for example gypsum. Preferable binders are cement or gypsum, particularly preferably cement.

Any known cement can be used as the cement. Preferably a cement is used which contains at least one calcium silicate, aluminate and/or ferrite. Preferably Portland cement (CEM I), Portland composite cement (CEM II), blast furnace cement (CEM III), pozzolanic cement (CEM IV) and composite cement (CEM V) or high alumina cement are used, as described in the literature (Cement, Principles of Production and Use, Verlag Bau+Technik, 2000).

As a further aggregate, the composition preferably contains sand. The sand preferably has a maximum grain size of 4 mm. The grain size can be determined by simple screening. As well as sand, the composition according to the invention can also contain gravel. The gravel used preferably has a minimum grain size of greater than 4 mm.

Further suitable aggregates which can be contained in the compositions according to the invention can for example be taken from the Römpp Chemical Dictionary, Georg Thieme Verlag, 2011, under the keyword concrete aggregate (Document code RD-02-01140).

Further components of the compositions according to the invention can be retardants such as for example gluconates, tartrates or phosphonates, solidification and/or hardening accelerators such as for example lithium carbonate, anti-shrinkage additives such as for example mono- or polyhydric alcohols, preservatives, pigments such as for example titanium dioxide or organic pigments, antifreeze agents such as for example chlorides, polymers such as for example acrylates, additives for internal curing, organic and inorganic thickeners such as for example starch or bentonite, hydrophobization agents such as for example silanes, siloxanes, silicone oils or salts of fatty acids and also flow improvers.

The production of the compositions according to the invention can be effected by simple mixing, preferably with stirring. The production can be effected in a batch process or continuously. The production of the composition is preferably effected at a temperature of 0° C. to 130° C., preferably 5° C. to 60° C., particularly preferably at the current external temperature at the production site.

The composition according to the invention can for example be a building material mixture, preferably a mortar or concrete mixture. This is particularly the case when the compositions according to the invention contain binders containing cement and/or calcium sulphate (or modifications thereof containing water of crystallization) and optionally one or more aggregates.

In the composition according to the invention, the mass content of glutamine-rich peptides based on the dry mortar mass is preferably from 0.001 to 10%, preferably from 0.01 to 2% and particularly preferably from 0.05 to 0.5%.

The compositions according to the invention can be used as or for the production of building material mixtures or building materials, in particular mortar mixtures or concrete mixtures. The building material mixtures can be used for the production of mortars or concrete. Also a subject of the present invention therefore are building materials, in particular prefabricated parts such as for example gas concrete prefabricated parts or gypsum plaster board for the production whereof a composition according to the invention was used or corresponding building materials or gas concrete which contain the compositions according to the invention.

The compositions according to the invention and the uses thereof are described below by way of example without it being intended to limit the invention to these examples of embodiments. If sectors, general formulae or compound classes are stated below, these are intended not only to include the corresponding sectors or groups of compounds which are explicitly mentioned, but also all part sectors and part groups of compounds which can be obtained by removal of individual values (sectors) or compounds. If documents are cited in the context of the present description, then the content thereof, particularly as regards the facts referred to, is intended to fall completely within the disclosure content of the present invention. When mean values are stated below, then, unless otherwise stated, these are number averaged mean values. Percentage values, unless otherwise stated, are stated in percentage by weight. If measured values are stated below, then, unless otherwise stated, these were determined at a temperature of 25° C. and a pressure of 1013 mbar.

FIG. 1 shows the air content of various samples according to the examples. All samples are preparations according to example 3a, sample 1 is the blank value. Sample 2 contains non-hydrolyzed gluten, samples 3 and 4 contain enzymatically hydrolyzed gluten according to example 1a and samples 5, 6 and 7 contain acid hydrolyzed gluten according to example 1b. The air content was determined according to example 3b.

EXAMPLES

General Methods and Materials

SDS-Page:
The polyacrylamide gel electrophoresis was performed in the presence of SDS under non-reducing conditions. A broad-range gel from Bio-Rad and the corresponding markers (6.5-200 kDa) were used, and the sample preparation and the electrophoresis were performed according to normal protocols.

Example 1

Hydrolysis of Wheat Protein

Example 1a

Enzymatic Hydrolysis of Gluten (According to Invention)

A 10 wt. % suspension of a commercially available wheat gluten (Amygluten 110, Syral) in water was hydrolyzed for several hours at a temperature of 50° C. and pH=7 by addition of 0.1 wt. % (based on the protein) of a commercially available protease (Neutrase® 0.8 L from Novozymes). The pH was kept constant by repeated addition of 10 wt. % NaOH (solution in water).

The hydrolysis was ended by inactivation of the enzymes by heating at 80° C. for 10 minutes. The samples were neutralized by addition of HCl as a 10 wt. % solution in water and finally freeze dried. The powder thus obtained was used for the application technology studies. The degree of hydrolysis was analyzed by oPA assay and the glutamine content by ammonia assay.

Example 1b

Aid Hydrolysis of Gluten (not According to Invention)

A commercially available wheat gluten (Amygluten 110, Syral) was hydrolyzed for several hours at a temperature of 95° C. with addition of HCl or alternatively $H_3PO_4$ at a pH of 1 (HCl) or 2 ($H_3PO_4$).

The hydrolysis was ended by neutralization with 10 wt. % NaOH (solution in water). The samples were freeze dried. The powder thus obtained was used for the application technology studies. The degree of hydrolysis was analyzed by oPA assay and the glutamine content by ammonia assay.

Example 2

Characterization of the Hydrolysates

Example 2a

Determination of the Degree of Hydrolysis

The degree of hydrolysis was determined by a modified ortho-phthalaldehyde (oPA) method, which was described by Church et al. (Church F C, Swaisgood H E, Porter D H, Catignani G L. 1983. Spectrophotometric assay using o-phthaldialdehyde for determination of proteolysis in milk and isolated milk proteins. Dairy Sci 66:1219-1227). Samples of the hydrolysate were solubilized in a 2 wt. % SDS solution (prepared from a 10 wt. % solution, Sigma-Aldrich, L4522) by heating and then diluted 1:100 in water. 100 µl of the diluted sample were mixed with 1 ml of a commercially available oPA reagent (Sigma-Aldrich, Order No. P0532) and the absorption at 340 nm measured after exactly 2 minutes. As the control, the same experiment was performed with water instead of sample. This blank value was subtracted from the sample measured values. A calibration line was plotted with serine and the number of released amino groups in the hydrolysates was calculated on the basis of this calibration line. Since ammonia released from the glutamine hydrolysis is also detected by the oPA method, the ammonia concentration determined by enzymatic ammonia assay was subtracted in the calculation of the released amino groups.

Example 2b

Determination of the Glutamine Content

The glutamine content of the non-hydrolyzed wheat gluten was determined by complete acid hydrolysis of the protein over 48 hours (under the same conditions as described in example 1b). As well as the complete hydrolysis of the polypeptide to amino acids, the glutamine side-chains are also completely hydrolyzed thereby to acid residues with formation of glutamic acid and ammonia/ammonium ions. The ammonia released was determined by means of a commercially available enzymatic test for ammonia measurement (Boehringer Mannheim/R-Biopharm, Order No. 11 112 732 035). The test is based on the photometric detection of the NADH consumption in the glutamate dehydrogenase-catalyzed reaction of the ammonia with α-ketoglutarate to give glutamate. Via the quantity of ammonia released, the glutamine content of the gluten could be determined. It was 35±2 wt. % based on the quantity of gluten used. In the same manner, the ammonia released during the enzymatic and the acidic partial hydrolysis (see Ex. 1a and 1b) was determined.

Through this, the total content of free and polymerically bound glutamic acid released by hydrolysis of glutamine residues could be determined. By subtraction of this amount of amino acid residues from the glutamine content of the starting material, the content of glutamine residues in the partial hydrolysates could be determined. The glutamine content did not change as a result of the enzymatic hydrolysis (35±2 wt. %), whereas as a result of the acidic hydrolysis it declined to ca. 12 wt. % after 12 hours.

Example 3

Use Examples

Example 3a

Production of a Mortar Compound for the Determination of Air Content and Spread on the Basis of DIN 18555 T2

The powdery components of the mortar mixture were weighed into the stirring vessel of a Hobart mixer. The vessel was fastened on the Hobart mixer and secured. For dust reduction, a damp nonwoven cloth was laid on the protective grille. The dry mixture was then mixed for two minutes at stirring level 1. The liquid additives were added to the mixing water and this mixture added to the dry mixture at the same stirring level (level 1) and then stirred for a further two minutes.

In order to obtain a higher air entrainment, the following procedure was then used: the stirrer motor was first switched off. Any bottom deposit formed (if present) was removed by hand and the stirring level then raised to level 2. The stirrer was again switched on and the mixture thoroughly mixed for two minutes.

Example 3b

Determination of the Percentage Air Content

A portion of the finished mortar compound from Example 3a was placed in the vessel of the air void measurement apparatus (Typ Testing, Serial number 2558, Manufacturer tecnotest, IT) and smoothed off. Then the upper part of the apparatus was applied, and the apparatus sealed and filled with distilled water. Then air was pumped into the upper part of the vessel and the pressure adjusted such that the needle on the scale lies on the zero line. The system was depressurized via a valve and the air content (in volume %) read off on the display.

The compositions according to the invention (samples 3, 4 and 5, Tab. 1 and FIG. 1) display a higher air entrainment than compositions which contain non-hydrolyzed gluten (sample 2, Tab. 1 and FIG. 1) and also display higher air values than the compositions not according to the invention (samples 6 and 7, Tab. 1 and FIG. 1).

TABLE 1

Glutamine content according to example 2b, degree of hydrolysis according to example 2a, air values according to example 3

| Sample | Description | Glutamine content [%] | Degree of hydrolysis [%] | Air value [%] |
|---|---|---|---|---|
| 1 | without additive | | | 4 |
| 2 | gluten | 35 | 0 | 36 |
| 3 | enzym. hydrolyzed, 6 hrs | 35 | 6.4 | 44 |
| 4 | enzym. hydrolyzed, 24 hrs | 35 | 7.0 | 49 |
| 5 | acid hydrolyzed, 5 hrs | 18 | 4.4 | 42 |
| 6 | acid hydrolyzed, 12 hrs | 13 | 4.5 | 30 |
| 7 | acid hydrolyzed, 48 hrs | 12 | 6.1 | 15 |

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of entraining air in a hydraulically curable building material, comprising:
   utilizing a glutamine-rich peptide or peptide mixture as an air entraining agent in the hydraulically curable building material;
   wherein the peptide or peptide mixture contains at least 16 wt.% of glutamine, based on the total mass of the peptide or of the peptides in the peptide mixture.

2. The method according to claim 1, further comprising:
   obtaining the glutamine-rich peptide or peptide mixture by enzymatic hydrolysis from proteins.

3. The method according to claim 1, further comprising:
   obtaining the glutamine-rich peptide or peptide mixture by enzymatic hydrolysis from plant proteins.

4. The method according to claim 1, further comprising:
   obtaining the glutamine-rich peptide or peptide mixture by enzymatic hydrolysis from a protein selected from the group consisting of wheat protein, maize protein, amaranth protein, and quinoa protein.

5. The method according to Claim 1;
   obtaining the glutamine-rich peptide or peptide mixture by enzymatic hydrolysis from wheat protein.

6. The method according to claim 1;
   wherein the glutamine-rich peptide or peptide mixture has a molecular weight distribution between 203 and 100,000 g/mol.

7. The method according to claim 6;
   wherein the glutamine-rich peptide or peptide mixture has a molecular weight distribution between 500 and 50,000 g/mol.

8. The method according to claim 7;
   wherein the glutamine-rich peptide or peptide mixture has a molecular weight distribution between 1,000 to 20,000 g/mol.

9. A method of entraining air in a hydraulically curable building material, comprising:
   utilizing a composition, comprising at least one peptide comprising at least 16 wt.% of glutamine based on the total mass of the peptide, as an air entraining agent in the hydraulically curable building material.

* * * * *